United States Patent
Liu et al.

(10) Patent No.: US 12,155,249 B2
(45) Date of Patent: Nov. 26, 2024

(54) ENERGY STORAGE DEVICE AND METHOD THEREOF FOR SUPPLYING POWER

(71) Applicant: Merry Electronics(Shenzhen) Co., Ltd., ShenZhen (CN)

(72) Inventors: Yung-Hsiang Liu, Taichung (TW); Wei-Kang Liang, Taichung (TW); Yu-Kai Wang, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 659 days.

(21) Appl. No.: 17/388,038

(22) Filed: Jul. 29, 2021

(65) Prior Publication Data
US 2023/0008320 A1     Jan. 12, 2023

(30) Foreign Application Priority Data
Jul. 6, 2021 (TW) .................................. 110124786

(51) Int. Cl.
    *H02J 7/00*      (2006.01)
(52) U.S. Cl.
    CPC .......... *H02J 7/0063* (2013.01); *H02J 7/0047* (2013.01); *H02J 7/007182* (2020.01)
(58) Field of Classification Search
    CPC .................................................. H02J 7/00714
    See application file for complete search history.

(56) References Cited

U.S. PATENT DOCUMENTS

| | | | |
|---|---|---|---|
| 2007/0114976 A1* | 5/2007 | Inokuchi | H02J 7/243 322/28 |
| 2013/0049699 A1* | 2/2013 | Jayaraman | H02M 1/10 320/137 |
| 2018/0269701 A1* | 9/2018 | Dai | H02M 3/33507 |
| 2019/0023145 A1* | 1/2019 | Komiyama | H02J 7/00 |
| 2021/0257971 A1* | 8/2021 | Kim | H03F 3/245 |
| 2022/0360192 A1* | 11/2022 | Uemura | H02M 1/12 |

FOREIGN PATENT DOCUMENTS

| | | | | |
|---|---|---|---|---|
| CN | 210517868 U | * | 5/2020 | |
| CN | 111999662 A | * | 11/2020 | ........... G01R 31/327 |
| JP | 3823503 B2 | * | 9/2006 | ............ H02J 7/0086 |

OTHER PUBLICATIONS

CN-111999662 Translation, Jiang (Year: 2020).*
CN-210517868 Translation Lei (Year: 2020).*
JP-3823503 Translation, Chuma (Year: 2006).*

* cited by examiner

*Primary Examiner* — Drew A Dunn
*Assistant Examiner* — Tynese V McDaniel
(74) *Attorney, Agent, or Firm* — JCIPRNET

(57) ABSTRACT

An energy storage device and a method thereof are provided. The power transfer circuit transfers a DC voltage provided by a battery module into an AC output voltage to provide the AC output voltage to an output end of the power transfer circuit for providing power to a load. When the AC output voltage is at a default phase, the power transfer circuit is disabled in a default period, and whether the energy storage device may be shut down is determined according to a voltage difference of the AC output voltage sensed by a sensing circuit during the default period.

16 Claims, 6 Drawing Sheets

ENERGY STORAGE DEVICE AND METHOD THEREOF FOR SUPPLYING POWER

CROSS-REFERENCE TO RELATED APPLICATION

This application claims the priority benefit of Taiwan application serial no. 110124786, filed on Jul. 6, 2021. The entirety of the above-mentioned patent application is hereby incorporated by reference herein and made a part of this specification.

BACKGROUND

Technology Field

The disclosure relates to a power supply device, and particularly relates to an energy storage device and a method thereof for supplying power.

Description of Related Art

Energy storage systems are used to provide electronic devices (i.e., loads) with stored power. In the process of supplying power, an energy storage system usually uses a power transfer circuit to transfer direct currents into alternating currents for a load to use or to charge. In the process of transferring power, power consumption may be generated inevitably. Even when the load is not connected, as long as the power transfer circuit is working, the power consumption may be generated, and continuous power consumption may drain the battery. Therefore, after the load is not in operation and removed from the energy storage system, if the output of the energy storage system is not shut down, the power transfer circuit may continue to consume power, which results in no power of the energy storage system for the user to use next time.

SUMMARY

The disclosure provides an energy storage device capable of accurately determining whether the load has been removed from the energy storage device or has been fully charged without configuring an additional circuit element; and after the load is removed from the energy storage device or the load is fully charged, the energy storage device is automatically shut down, which contributes to effectively reducing power consumption.

The energy storage device of the disclosure includes a battery module, a power transfer circuit, a sensing circuit, and a control circuit. The battery module provides a first DC voltage. The power transfer circuit is coupled to the battery module and transfers the first DC voltage into an AC output voltage to provide the AC output voltage to an output end of the power transfer circuit for providing power to a load. The sensing circuit is coupled to the output end of the power transfer circuit to sense the AC output voltage. The control circuit is coupled to the power transfer circuit and the sensing circuit. The control circuit disables the power transfer circuit in a default period when the AC output voltage is at a default phase and determines whether the energy storage device is shut down according to a voltage difference of the AC output voltage sensed by the sensing circuit during the default period.

In an embodiment of the disclosure, the power transfer circuit includes an output capacitor. The output capacitor is coupled to the output end of the power transfer circuit. The AC output voltage is generated on the output capacitor, and during the default period, a voltage on the output capacitor is only related to the load.

In an embodiment of the disclosure, the power transfer circuit further includes a DC/DC converter and a DC/AC inverter. The DC/DC converter is coupled to the battery module and the control circuit to transfer the first DC voltage into a second DC voltage. The DC/AC inverter is coupled to the DC/DC converter. The DC/AC inverter includes the output capacitor and transfers the second DC voltage into the AC output voltage.

In an embodiment of the disclosure, the control circuit turns off a plurality of voltage conversion switches included in the DC/AC inverter during the default period to disable the power transfer circuit. When the voltage conversion switches are turned off, a voltage on the output capacitor is only related to the load.

In an embodiment of the disclosure, the control circuit determines a resistance value of the load according to a voltage difference of the AC output voltage and determines whether the energy storage device is shut down according to the resistance value of the load.

In an embodiment of the disclosure, when the resistance value of the load is less than or equal to a default resistance value, the control circuit periodically disables the power transfer circuit and determines whether the energy storage is shut down according to a voltage difference of the AC output voltage in the default period, and when the resistance value of the load is greater than the default resistance value, the energy storage device is shut down.

In an embodiment of the disclosure, the energy storage device further includes a switch circuit. The switch circuit is coupled to the output end of the power transfer circuit, the control circuit, and the load and controlled by the control circuit to enter an off-state during a first detection period and enter an on-state during a second detection period. The control circuit disables the power transfer circuit in the default period when the AC output voltage is at the default phase during the first detection period and the second detection period, respectively to obtain a first corresponding voltage difference value of the AC output voltage during the first detection period and a second corresponding voltage difference value of the AC output voltage during the second detection period. The control circuit determines whether the energy storage device is shut down according to a difference between the first voltage difference value and the second voltage difference value.

In an embodiment of the disclosure, when the difference is greater than or equal to a default difference, the control circuit periodically disables the power transfer circuit, obtains the second voltage difference value, and determines whether the energy storage device is shut down according to the difference between the first voltage difference value and the second voltage difference. When the difference is less than the default difference, the energy storage device is shut down.

In an embodiment of the disclosure, the default phase is close to 0 or 180 degrees.

The disclosure also provides a method of an energy storage device for supplying power, and the energy storage device includes a battery module and a power transfer circuit. The power transfer circuit transfers a first DC voltage provided by the battery module into an AC output voltage to provide the AC output voltage to an output end of the power transfer circuit for providing power to a load. The method of the energy storage device for supplying power includes steps as follows. The AC output voltage generated by the power transfer circuit is sensed. The power transfer circuit is disabled in a default period when the AC output voltage is at a default phase. Whether the energy storage device is shut down is determined according to a voltage difference of the sensed AC output voltage during the default period.

In an embodiment of the disclosure, the power transfer circuit includes an output capacitor coupled to the output end of the power transfer circuit. The AC output voltage is generated on the output capacitor, and during the default period, a voltage on the output capacitor is related to the load.

In an embodiment of the disclosure, the power transfer circuit further includes a DC/DC converter and a DC/AC inverter. The DC/AC inverter includes the output capacitor. The method of the energy storage device for supplying power includes steps as follows. The DC/DC converter is controlled to transfer the first DC voltage into a second DC voltage. The DC/AC inverter is controlled to transfer the second DC voltage into the AC output voltage.

In an embodiment of the disclosure, the method of the energy storage device for supplying power further includes the following steps. A plurality of voltage conversion switches included in the DC/AC inverter are turned off during the default period to disable the power transfer circuit. When the voltage conversion switches are turned off, a voltage on the output capacitor is only related to the load.

In an embodiment of the disclosure, the method of the energy storage device for supplying power further includes the following steps. A resistance value of the load is determined according to a voltage difference of the AC output voltage. Whether the energy storage device is shut down is determined according to the resistance value of the load.

In an embodiment of the disclosure, the method of the energy storage device for supplying power further includes the following steps. The power transfer circuit is periodically disabled and whether the energy storage device is shut down is determined according to a voltage difference of the AC output voltage in the default period when the resistance value of the load is less than or equal to a default resistance value. The energy storage device is shut down when the resistance value of the load is greater than the default resistance value.

In an embodiment of the disclosure, the energy storage device further includes a switch circuit. The switch circuit is coupled between the output end of the power transfer circuit and the load. The method of the energy storage device for supplying power further includes the following steps. The switch circuit is controlled to enter an off-state during a first detection period. During the first detection period, when the AC output voltage is at the default phase, the power transfer circuit is disabled in the default period to obtain a first voltage difference value of the AC output voltage during the default period. The switch circuit is controlled to enter an on-state during a second detection period. During the second detection period, when the AC output voltage is at the default phase, the power transfer circuit is disabled in the default period to obtain a second voltage difference value of the AC output voltage during the default period. Whether the energy storage device is shut down is determined according to a difference between the first voltage difference value and the second voltage difference value.

In an embodiment of the disclosure, the method of the energy storage device for supplying power further includes the following steps. The power transfer circuit is periodically disabled and the second voltage difference value is obtained when the difference is greater than or equal to a default difference, and whether the energy storage device is shut down is determined according to the difference between the first voltage difference value and the second voltage difference value. The energy storage device is shut down when the difference is less than the default difference.

In an embodiment of the disclosure, the default phase is close to 0 or 180 degrees.

In summary, in the embodiments of the disclosure, the power transfer circuit is disabled in a period of time when the AC output voltage is at a default phase, and whether the connection between the load and the energy storage device is disconnected or whether the load is fully charged is determined according to the voltage difference of the sensed AC output voltage during this period of time. Also, the energy storage device is automatically shut down when the load is removed from the energy storage device or the load is fully charged. In this way, the energy storage device requires no additional elements for detecting the load, the energy storage device can be automatically shut down according to the operation state of the load, and the power consumption can be effectively reduced.

In order to make the aforementioned features and advantages of the invention comprehensible, embodiments accompanied with drawings are described specifically below.

DESCRIPTION OF THE EMBODIMENTS

Figure 1:
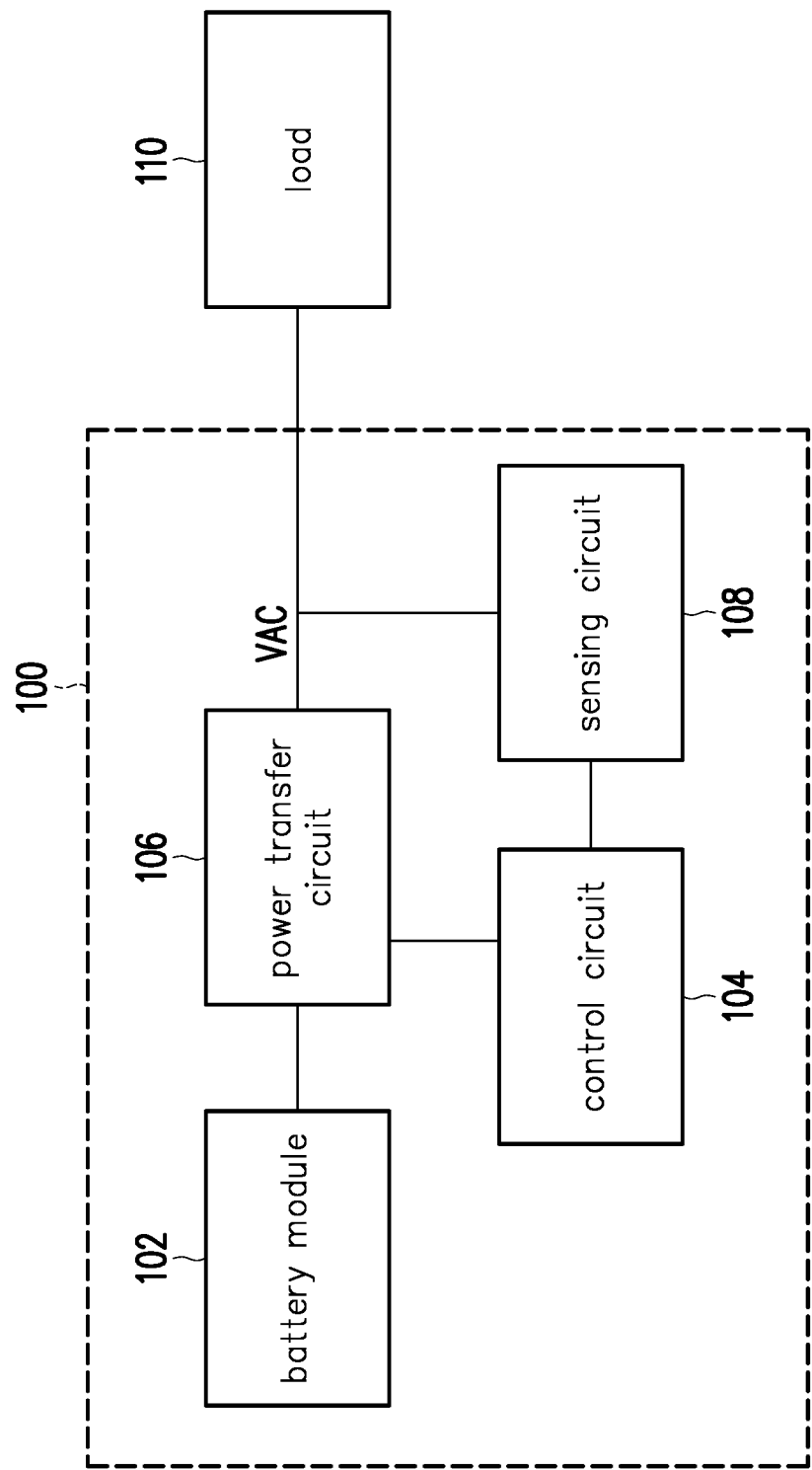
FIG. 1 is a schematic view of an energy storage device according to an embodiment of the disclosure.

FIG. 1 is a schematic view of an energy storage device according to an embodiment of the disclosure. Referring to FIG. 1, an energy storage device 100 may be a power supply device for supplying power to a load 110. The energy storage device 100 includes a battery module 102, a control circuit 104, a power transfer circuit 106, and a sensing circuit 108. The battery module 102 is coupled to the power transfer circuit 106. The power transfer circuit 106 is coupled to the control circuit 104, and the output end of the power transfer circuit 106 are coupled to the sensing circuit 108 and the load 110 which is disposed outside and connected to the energy storage device 100. The control circuit 104 is coupled to the sensing circuit 108.

The power transfer circuit 106 can transfer the DC voltage provided by the battery module 102 into an AC output voltage VAC to provide the AC output voltage VAC to the output end of the power transfer circuit 106 for providing power to the load 110. The sensing circuit 108 can sense the AC output voltage VAC output by the power transfer circuit 106 and provide the sensing result to the control circuit 104. The power transfer circuit 106 is disabled by the control circuit 104 in a default period when the AC output voltage VAC is at a default phase, and whether the energy storage device 100 may be shut down is determined according to the voltage difference of the AC output voltage VAC sensed by the sensing circuit 108 during the default period.

The connection between the load 110 and the energy storage device 100 or whether the load 110 is fully charged may affect the resistance value of the output end of the energy storage device 100, and the resistance value of the output end can reflect the AC output voltage VAC sensed by the sensing circuit 108. Therefore, whether the connection between the load 110 and the energy storage device 100 is disconnected or whether the load 110 is fully charged is determined according to the voltage difference of the AC output voltage VAC during the default period. For example, when the load 110 is removed from the energy storage device 100 or the load 110 is fully charged, the output end of the energy storage device 100 is in an open state, and the resistance is equivalent to infinity. Therefore, during the default period when the power transfer circuit 106 is disabled, compared to when the load 110 and the energy storage device 100 are still connected or the load 110 has not been fully charged, the decrease in the AC output voltage VAC may be less. Consequently, the control circuit 104 can determine whether the connection between the load 110 and the energy storage device 100 is disconnected or whether the load 110 is fully charged according to the voltage difference of the AC output voltage VAC during the default period, and accordingly determine whether the energy storage device 100 may be shut down.

In this way, by disabling the power transfer circuit 106 for a default period, the voltage difference of the AC output voltage VAC is sensed to determine the operation state (e.g., connected, removed, or fully charged) of the load 110, so an additional detection element for the load 110 is not required for determining whether the load 110 is connected to the energy storage device 100 or is fully charged. Accordingly, it can be accurately determined whether the load is still connected or disconnected, and when the load 110 is disconnected or fully charged, the energy storage device is shut down and enters the low power consumption mode, so that the power consumption is effectively reduced and the power of the battery module 102 is saved.

Figure 2:
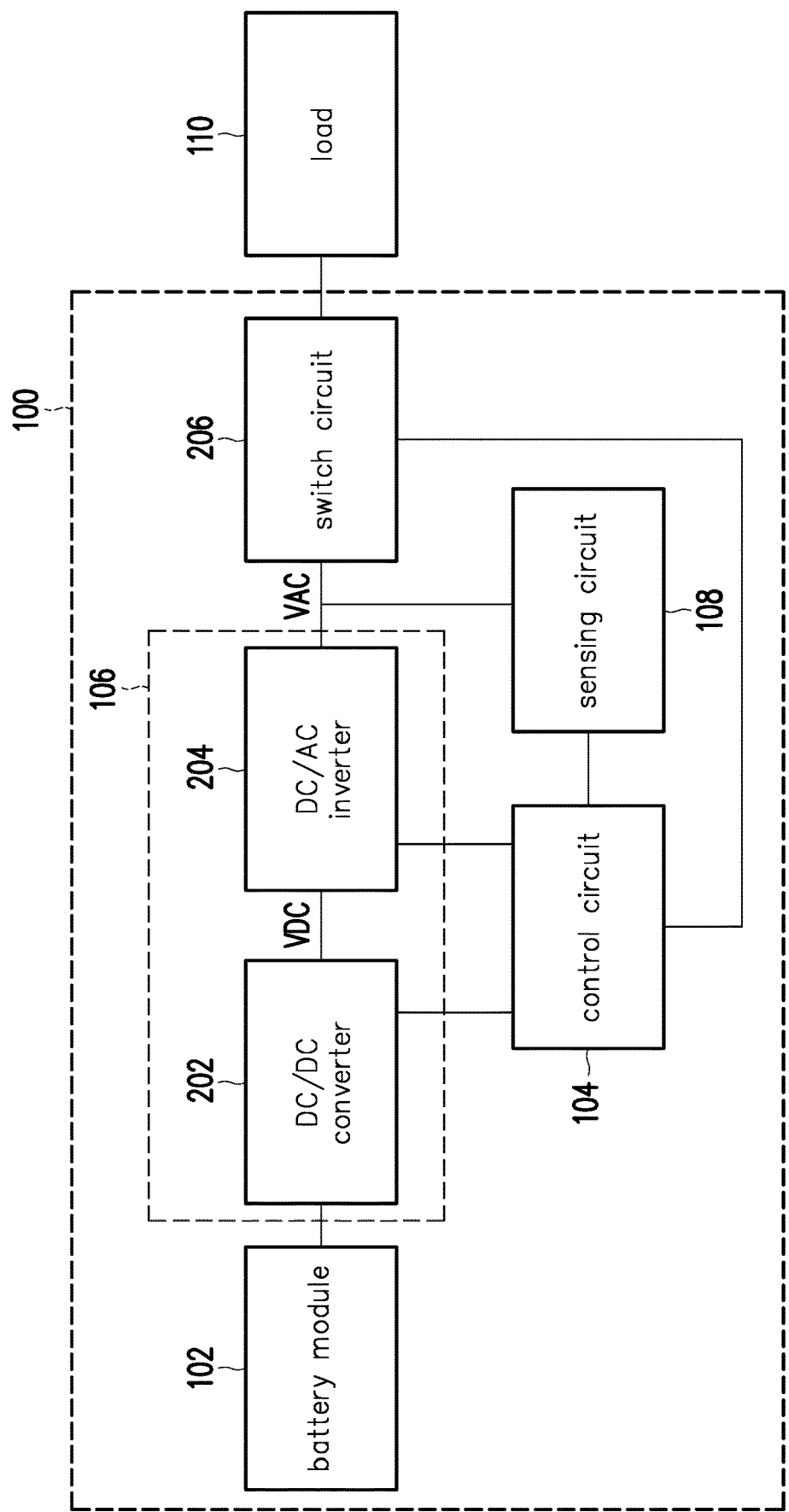
FIG. 2 is a schematic view of an energy storage device according to another embodiment of the disclosure.

FIG. 2 is a schematic view of an energy storage device according to another embodiment of the disclosure. Compared with the embodiment of FIG. 1, in the embodiment of FIG. 2, the power transfer circuit 106 includes a DC/DC converter 202 and a DC/AC inverter 204, and the energy storage device 100 further includes a switch circuit 206. The DC/DC converter 202 is coupled to the battery module 102, the control circuit 104, and the DC/AC inverter 204. The DC/AC inverter 204 is coupled to the control circuit 104, the sensing circuit 108, and the switch circuit 206. The switch circuit 206 is coupled to the load 110.

The DC/DC converter 202 can transfer the DC voltage provided by the battery module 102 into a DC voltage VDC and provide the DC voltage VDC to the DC/AC inverter 204. For example, the DC/DC converter 202 may be a boost converter, but the disclosure is not limited thereto. The DC/AC inverter 204 can transfer the DC voltage VDC into an AC output voltage VAC and provide the AC output voltage VAC to the load 110 through the switch circuit 206.

Figure 3:
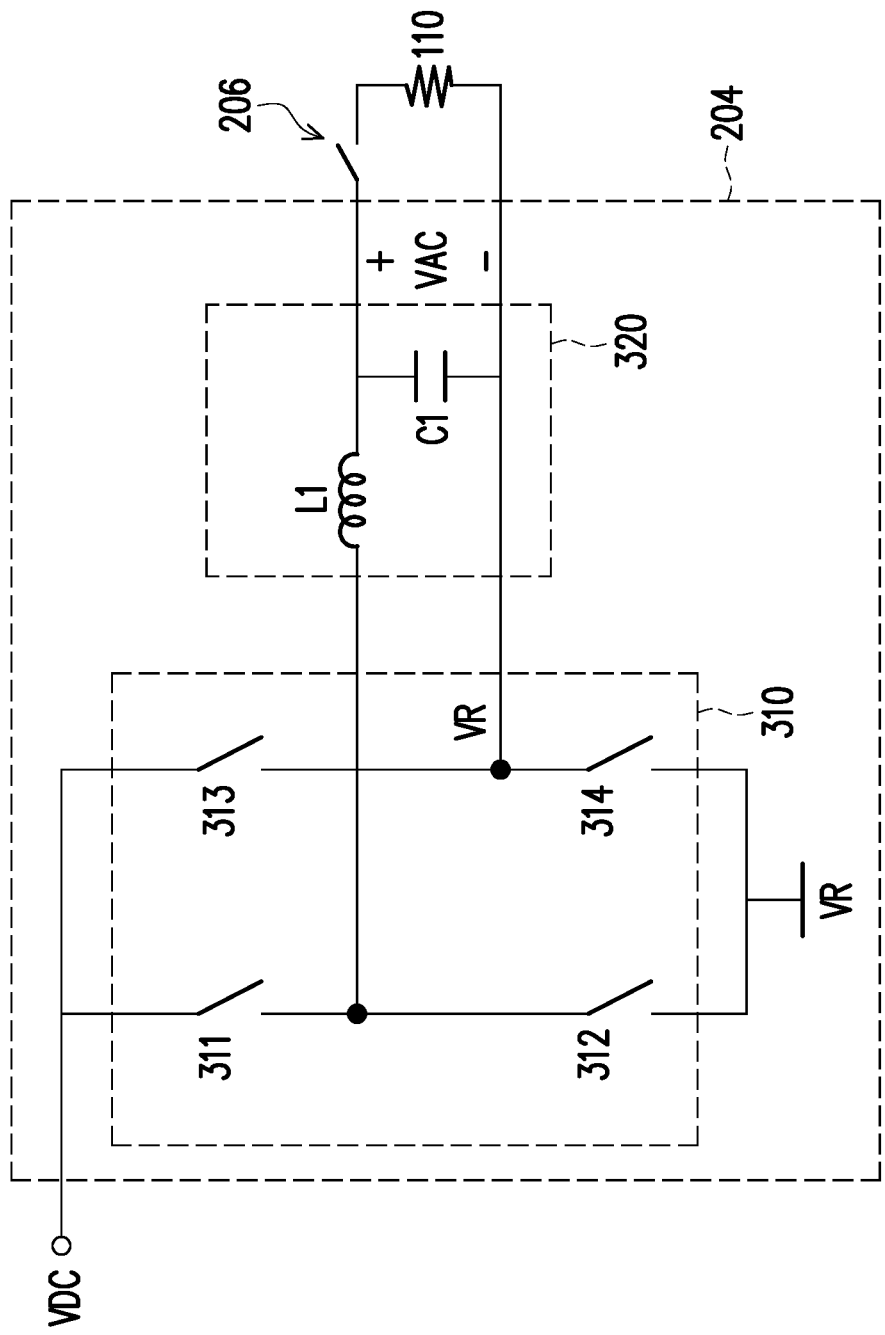
FIG. 3 is a circuit diagram of a DC/AC inverter according to an embodiment of the disclosure.

FIG. 3 is a circuit diagram of a DC/AC inverter according to an embodiment of the disclosure. Specifically, the DC/AC inverter 204 may include a voltage conversion switch circuit 310 and an inductance capacitor circuit 320, for example. The voltage conversion switch circuit 310 is coupled to the inductance capacitor circuit 320. The inductance capacitor circuit 320 is coupled to the switch circuit 206.

In the embodiment, the voltage conversion switch circuit 310 includes multiple voltage conversion switches 311, 312, 313, and 314. The voltage conversion switches 311, 312, 313, and 314 can be configured as full-bridge circuits. The voltage conversion switches 311 and 312 are connected in series between the DC voltage VDC and a reference voltage VR, and the voltage conversion switches 313 and 314 are connected in series between the DC voltage VDC and the reference voltage VR. An inductor L1 is coupled between the common contact of voltage conversion switch 311 and the voltage conversion switch 312 and the switch circuit 206, and an output capacitor C1 is coupled between the switch circuit 206 and the common contact of the voltage conversion switch 313 and the voltage conversion switch 314.

The voltage conversion switch circuit 310 can receive the DC voltage VDC and is controlled by the control circuit 104 to switch the on-state of the voltage conversion switches 311, 312, 313, and 314 to generate an AC output voltage VAC on the output capacitor C1. When detecting the load 110, the voltage conversion switches 311, 312, 313, and 314 are controlled by the control circuit 104 and shut down for a default period when the AC output voltage VAC is at a default phase, so that the voltage conversion switch circuit 310 is disabled during the default period. During the default period, the switch circuit 206 is controlled by the control circuit 104 to be in an on state, the AC output voltage VAC on the output capacitor C1 is only related to the load 110, and the resistance value of the load 110 can be reflected on the AC output voltage VAC. Therefore, according to the resistance value of the load 110 calculated from the AC output voltage VAC during the default period, the connection of the load 110 and the energy storage device 100 or the charging of the load 110 can be acquired.

Figure 4:
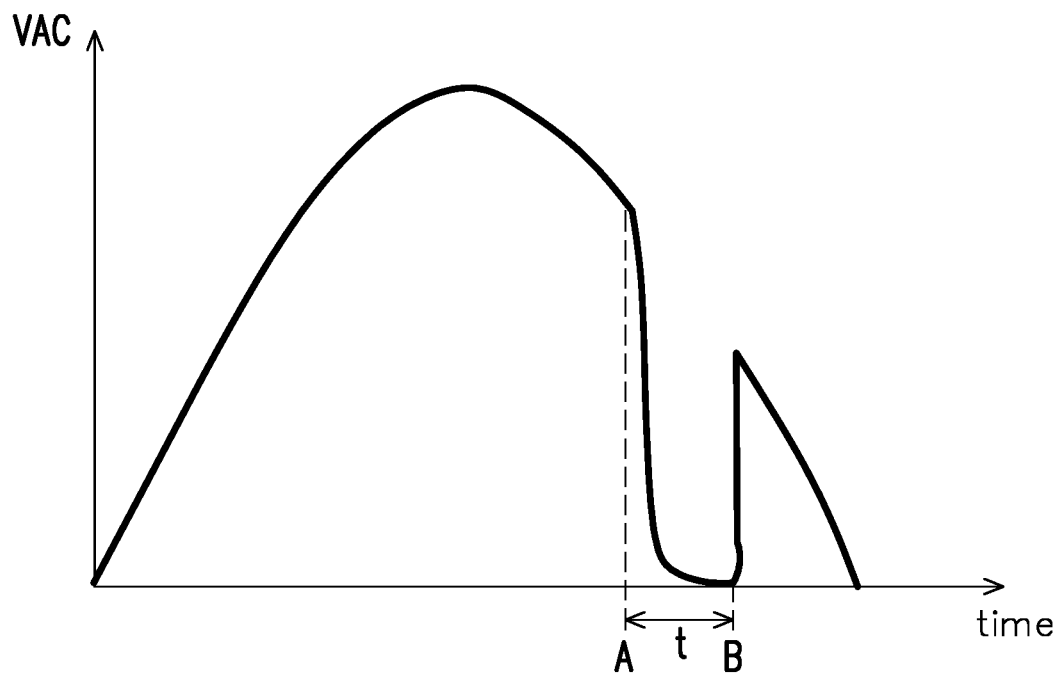
FIG. 4 and FIG. 5 are schematic views of an AC output voltage according to an embodiment of the disclosure.
Figure 5:
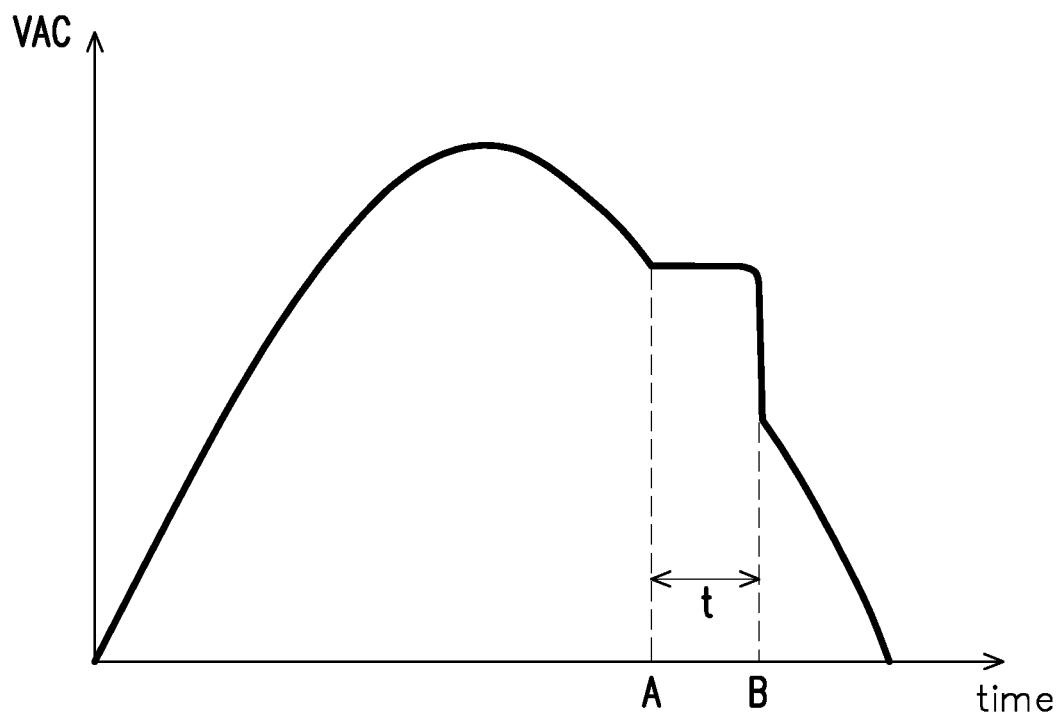

For example, FIG. 4 and FIG. 5 are schematic views of an AC output voltage according to an embodiment of the disclosure. Referring to both FIG. 4 and FIG. 5, when the AC output voltage VAC is at a default phase, the control circuit 104 can turn off the voltage conversion switches 311, 312, 313, and 314 during a default period t (time A to time B), and during the default period t, the AC output voltage VAC may only be related to the load 110. The default phase may be close to 0 or 180 degrees, for example, to reduce the influence of waveform distortion on total harmonic distortion (THD), but the disclosure is not limited thereto. In other embodiments, the default phase may also be other phases ranging from 0 degrees to 360 degrees.

The control circuit 104 can calculate the AC output voltage VAC during the period from time A to time B to acquire the resistance value of the load 110, as shown in the following formula (1):

$$VAC(t) = E \times e^{-\frac{1}{RL \times C}} \quad (1)$$

VAC(t) is expressed as the relationship between the AC output voltage VAC on the output capacitor C1 and the time t. E is expressed as the voltage of the AC output voltage VAC at time A. e is expressed as a natural constant. RL is expressed as the resistance value of the load 110. C is expressed as the capacitance value of the output capacitor C1.

Accordingly, the control circuit 104 can acquire the resistance value RL according to the voltage difference (i.e., VAC(t)) of the AC output voltage VAC in a default period, and the connection between the load 110 and the energy storage device 100 or the charging of the load 110 is determined according to the resistance value RL.

When the calculated resistance value RL is less than or equal to the default resistance value, as shown in FIG. 4, it means that the load 110 consumes the power of the output capacitor C1, and the AC output voltage VAC is decreased along with the power consumption of the output capacitor C1 during the default period t, so the control circuit 104 can determine that the load 110 is still connected to the energy storage device 100. Meanwhile, the control circuit 104 can perform the detection of the connection of the load 110 again until the next time when the AC output voltage VAC is at a default phase, and the control circuit 104 can periodically disable the voltage conversion switch circuit 310 and determine whether the energy storage device 100 may be shut down according to the voltage difference of the AC output voltage VAC on the output capacitor C1 during the default period until it is detected that the resistance value of the load 110 is greater than the default resistance value, that is, the connection between the load 110 and the energy storage device 100 is disconnected or the load 110 is fully charged.

Moreover, when the resistance value RL is greater than the default resistance value, as shown in the embodiment in FIG. 5, it means that the load 110 hardly consumes the power of the output capacitor C1, and the voltage value of the AC output voltage VAC hardly changes during the default period t. Therefore, the control circuit 104 can determine that the load 110 has been fully charged, or the load 110 has been removed from the energy storage device 100, so that the output end of the energy storage device 100 is in an open circuit state. Meanwhile, the control circuit 104 can shut down the energy storage device 100 to reduce power consumption. For example, the control circuit 104 can stop each circuit in the energy storage device 100, or by providing power required for resuming normal operation, the energy storage device 100 can enable the essential circuits to work.

Note that in other embodiments, whether the load 110 is fully charged or whether the connection between the load 110 and the energy storage device 100 is disconnected can be determined by only comparing the difference of the AC output voltage VAC during different detection periods without using the resistance value RL obtained by the calculation of formula (1). For example, the switch circuit 206 can be controlled by the control circuit 104 and enter the off-state during the first detection period. For example, the first detection period can be the period during which the energy storage device 100 is turned on, but the disclosure is not limited thereto. During the first detection period, the voltage conversion switches 311, 312, 313, and 314 are controlled by the control circuit 104, and the voltage conversion switch circuit 310 is disabled for a default period t when the AC output voltage VAC is at a default phase. During the default period t, the switch circuit 206 is in the off-state and the output capacitor C1 cannot be discharged, so the waveform of the AC output voltage VAC is similar to the waveform shown in FIG. 5. Meanwhile, the control circuit 104 obtains a first corresponding voltage difference value of the AC output voltage VAC during the first detection period. The first voltage difference value corresponds to the state where the energy storage device 100 is not connected to a load and can serve as a criterion for determining the connection of the load 110 or whether the load 110 is fully charged.

The switch circuit 206 can also be controlled by the control circuit 104 and enter the on-state during the second detection period. The second detection period can be the period during which the energy storage device 100 is in operation after completing the booting process. Like the first detection period, during the second detection period, the voltage conversion switches 311, 312, 313, and 314 are controlled by the control circuit 104, and the voltage conversion switch circuit 310 is disabled for a default period t when the AC output voltage VAC is at a default phase. During the default period t, since the switch circuit 206 is in the on-state, the AC output voltage VAC on the output capacitor C1 is only related to the load 110. The control circuit 104 can obtain a second corresponding voltage difference value of the AC output voltage VAC during the second detection period, and the second voltage difference value represents the operation states of the energy storage device 100 and the load 110. When the load 110 is connected to the energy storage device 100, the waveform of the AC output voltage VAC is similar to the waveform shown in FIG. 4, and when the load 110 is not connected to the energy storage device 100 or the load 110 is fully charged, the waveform of the AC output voltage VAC is similar to the waveform shown in FIG. 5.

The control circuit 104 can determine whether the energy storage device 100 may be shut down according to the difference between the first voltage difference value and the second voltage difference value. When the difference is greater than or equal to the default difference, it means that the AC output voltage VAC is decreased significantly during the second detection period, that is, the load 110 is still connected to the energy storage device 100. Similarly, the control circuit 104 can periodically disable voltage conversion switch circuit 310, and obtain the second voltage difference value periodically to determine whether the energy storage device 100 may be shut down according to the voltage difference of the AC output voltage VAC on the output capacitor C during the default period until the difference is less than the default difference.

When the difference is less than the default difference, it means that the AC output voltage VAC is not decreased significantly during the second detection period, that is, the connection between the load 110 and the energy storage device 100 has been disconnected or the load 110 has been fully charged. Meanwhile, the control circuit 104 can shut down the energy storage device 100 to reduce power consumption.

Consequently, when the connection of the load 110 and the energy storage device 100 or the charging of the load 110 is determined according to the difference between the first voltage difference value and the second voltage difference value, the charging of the load 110 or the connection of the load 110 and the energy storage device 100 can be determined in a simpler way without using the resistance value RL obtained by the calculation of formula (1), and whether the energy storage device 100 may be shut down is further determined.

Figure 6:
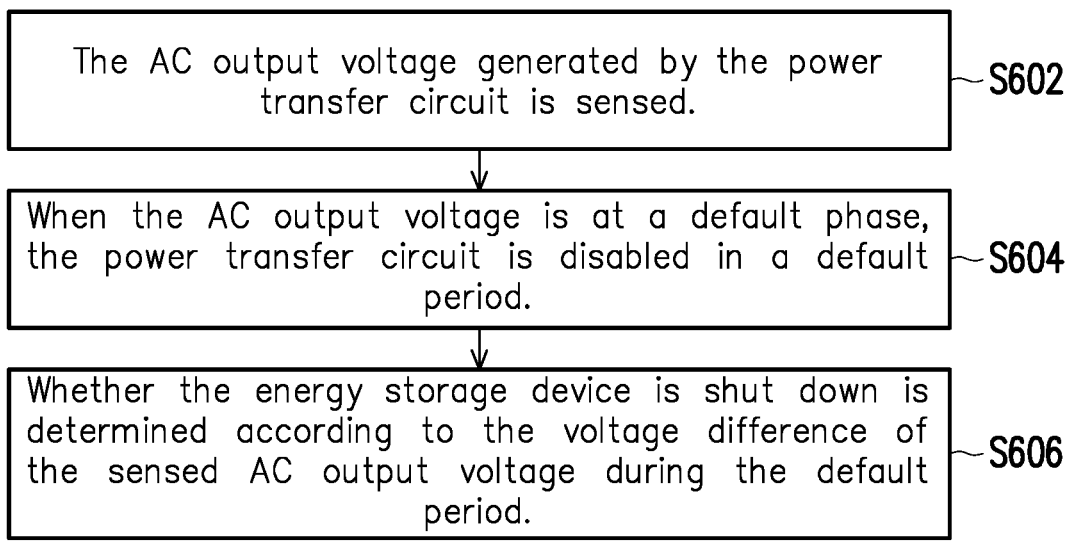
FIG. 6 is a flowchart of a method of an energy storage device for supplying power according to an embodiment of the disclosure.

FIG. 6 is a flowchart of a method of an energy storage device for supplying power according to an embodiment of the disclosure. The energy storage device includes a battery module and a power transfer circuit. The power transfer circuit transfers a DC voltage provided by the battery module into an AC output voltage to provide the AC output voltage to the output end of the power transfer circuit for providing power to a load. For example, the AC output voltage can be generated on an output capacitor coupled to the output end of the power transfer circuit. The power transfer circuit can include a DC/DC converter and a DC/AC inverter, and the DC/AC inverter includes the output capacitor. According to the embodiments, the method of the energy storage device for supplying power may include the following steps. First, the AC output voltage generated by the power transfer circuit is sensed (step S602). Furthermore, the AC output voltage can be obtained by first controlling the DC/DC converter to transfer a first DC voltage into a second DC voltage and then controlling the DC/AC inverter to transfer the second DC voltage. Next, when the AC output voltage is at a default phase, the power transfer circuit is disabled in a default period (step S604). For example, multiple voltage conversion switches included in the DC/AC inverter can be turned off during the default period to disable the power transfer circuit. When the multiple voltage conversion switches are turned off, the voltage on the output capacitor is only related to the load, and the default phase can be close to 0 or 180 degrees to reduce the influence of waveform distortion on total harmonic distortion (THD), but the disclosure is not limited thereto. Then whether the energy storage device may be shut down is determined according to the voltage difference of the sensed AC output voltage during the default period (step S606). Furthermore, the resistance value of the load can be determined according to the voltage difference of the AC output voltage, and the connection of the load or the charging of the load can be determined according to the resistance value of the load to determine whether the energy storage device may be shut down. When the resistance value of the load is less than or equal to the default resistance value, the power transfer circuit can be disabled periodically, whether the energy storage device may be shut down is determined according to the voltage difference of the AC output voltage during the default period, and S604 and S606 are periodically performed until the resistance value of the load is greater than the default resistance value, so that the energy storage device is shut down.

Figure 7:
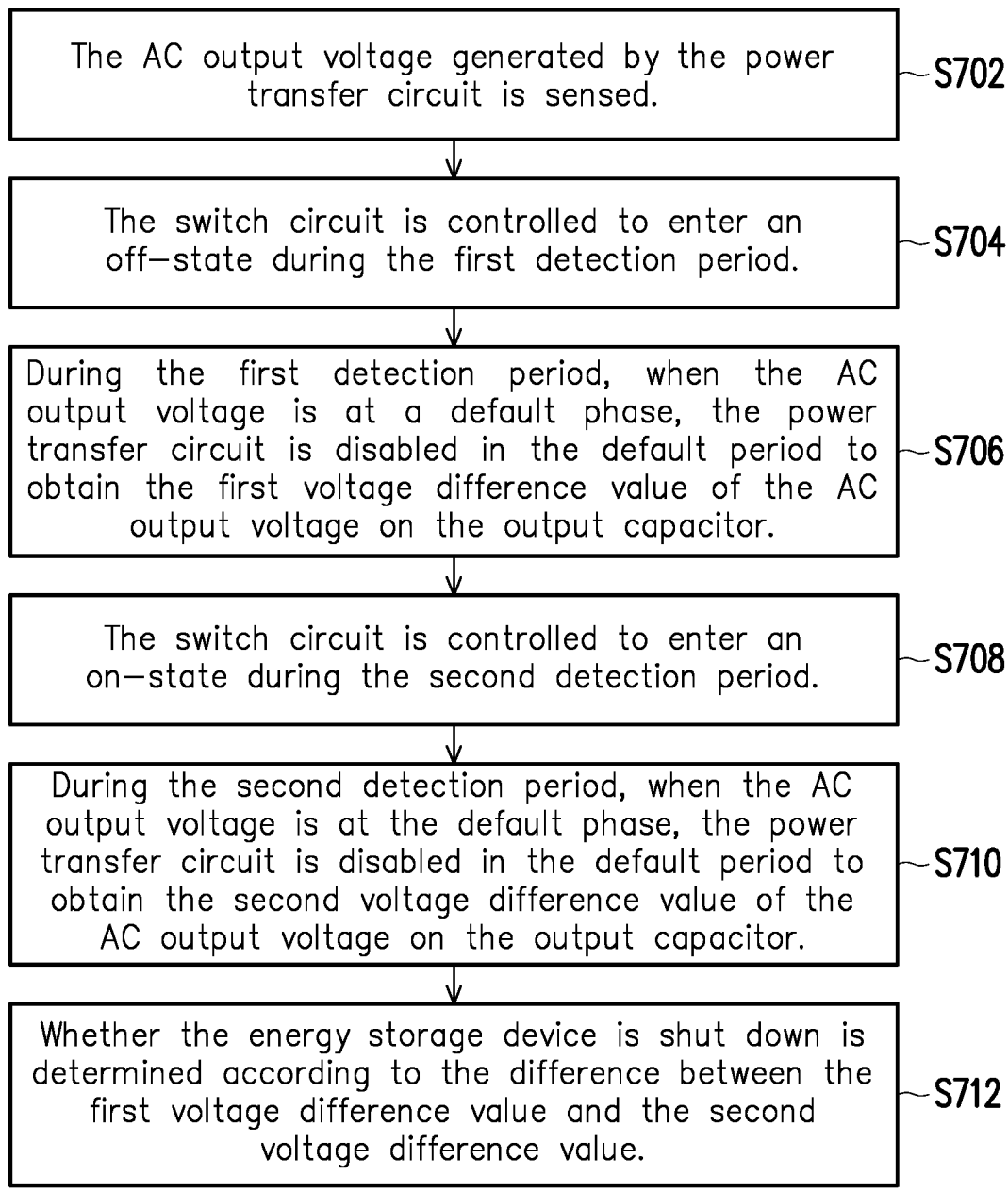
FIG. 7 is a flowchart of a method of an energy storage device for supplying power according to another embodiment of the disclosure.

FIG. 7 is a flowchart of a method of an energy storage device for supplying power according to another embodiment of the disclosure. According to the embodiments, the energy storage device further includes a switch circuit. The method of the energy storage device for supplying power may include the following steps. First, the AC output voltage generated by the power transfer circuit is sensed (step S702). Next, the switch circuit is controlled to enter an off-state during the first detection period (step S704). During the first detection period, when the AC output voltage is at a default phase, the power transfer circuit is disabled in the default period to obtain the first voltage difference value of the AC output voltage on the output capacitor (step S706). Then, the switch circuit is controlled to enter an on-state during the second detection period (step S708). During the second detection period, the power transfer circuit is disabled in a default period when the AC output voltage is at the default phase to obtain the second voltage difference value of the AC output voltage on the output capacitor (step S710). Then, whether the energy storage device may be shut down is determined according to the difference between the first voltage difference value and the second voltage difference value (step S712). When the difference is greater than or equal to the default difference, step S710 and step S712 can be repeated periodically, and when the difference is less than the default difference, the energy storage device is shut down.

In summary, in the energy storage device of the embodiments of the disclosure, the connection or the charging of the load can be determined by using the obtained AC output voltage when the power transfer circuit is disabled in a default period, and whether the storage energy device may be shut down is further determined so that unnecessary power consumption can be reduced. In this way, whether the connection between the load and the energy storage device is disconnected or whether the load is fully charged can be determined without configuring the detection element of the load, the energy storage device is shut down according to a determining result, and therefore low power consumption is achieved. In some embodiments, the connection between the load and the energy storage device or the charging of the load may be determined according to the difference of the voltage difference values of the AC output voltage during different detection periods, and whether the energy storage device is shut down can be determined in a simpler way to reduce power consumption.

Although the disclosure has been described with reference to the above embodiments, they are not intended to limit the disclosure. It will be apparent to one of ordinary skill in the art that modifications and changes to the described embodiments may be made without departing from the spirit and the scope of the disclosure. Accordingly, the scope of the disclosure will be defined by the attached claims and their equivalents and not by the above detailed descriptions.

What is claimed is:

1. An energy storage device, comprising:
   a battery module providing a first DC voltage;
   a power transfer circuit coupled to the battery module and transferring the first DC voltage into an AC output voltage to provide the AC output voltage to an output end of the power transfer circuit for providing power to a load;
   a sensing circuit coupled to the output end of the power transfer circuit to sense the AC output voltage;
   a control circuit coupled to the power transfer circuit and the sensing circuit; and
   a switch circuit coupled to the output end of the power transfer circuit, the control circuit, and the load and controlled by the control circuit to enter an off-state during a first detection period and enter an on-state during a second detection period, wherein the control circuit disables the power transfer circuit in the default period when the AC output voltage is at the default phase during the first detection period and the second detection period, respectively to obtain a first corresponding voltage difference value of the AC output voltage during the first detection period and a second corresponding voltage difference value of the AC output voltage during the second detection period, and the control circuit determines whether to shut down the energy storage device according to a difference between the first voltage difference value and the second voltage difference value.

2. The energy storage device according to claim 1, wherein the power transfer circuit comprises:
   an output capacitor coupled to the output end of the power transfer circuit, wherein the AC output voltage is generated on the output capacitor.

3. The energy storage device according to claim 2, wherein the power transfer circuit comprises:
   a DC/DC converter coupled to the battery module and the control circuit to transfer the first DC voltage into a second DC voltage; and
   a DC/AC inverter coupled to the DC/DC converter, wherein the DC/AC inverter comprises the output capacitor, and the DC/AC inverter transfers the second DC voltage into the AC output voltage.

4. The energy storage device according to claim 3, wherein the control circuit turns off a plurality of voltage conversion switches comprised in the DC/AC inverter during the default period to disable the power transfer circuit.

5. The energy storage device according to claim 1, wherein the control circuit determines a resistance value of the load according to a voltage difference of the AC output voltage and determines whether to shut down the energy storage device according to the resistance value of the load.

6. The energy storage device according to claim 5, wherein when the resistance value of the load is less than or equal to a default resistance value, the control circuit periodically disables the power transfer circuit and determines whether to shut down the energy storage device according to a voltage difference of the AC output voltage in the default period, and when the resistance value of the load is greater than the default resistance value, the energy storage device is shut down.

7. The energy storage device according to claim 1, wherein when the difference is greater than or equal to a default difference, the control circuit periodically disables the power transfer circuit, obtains the second voltage difference value, and determines whether to shut down the energy storage device according to the difference between the first voltage difference value and the second voltage difference, and when the difference is less than the default difference, the energy storage device is shut down.

8. The energy storage device according to claim 1, wherein the default phase is close to 0 or 180 degrees.

9. A method of an energy storage device for supplying power, wherein the energy storage device comprises a battery module and a power transfer circuit, the power transfer circuit transfers a first DC voltage provided by the battery module into an AC output voltage to provide the AC output voltage to an output end of the power transfer circuit for providing power to a load, the energy storage device further comprises a switch circuit coupled between the output end of the power transfer circuit and the load, and the method of the energy storage device for supplying power comprises:

sensing the AC output voltage generated by the power transfer circuit;

controlling the switch circuit to enter an off-state during a first detection period;

during the first detection period, when the AC output voltage is at the default phase, disabling the power transfer circuit in the default period to obtain a first voltage difference value of the AC output voltage during the default period;

controlling the switch circuit to enter an on-state during a second detection period;

during the second detection period, when the AC output voltage is at the default phase, disabling the power transfer circuit in the default period to obtain a second voltage difference value of the AC output voltage during the default period; and determining whether to shut down the energy storage device according to a difference between the first voltage difference value and the second voltage difference value.

10. The method of the energy storage device for supplying power according to claim 9, the power transfer circuit comprises an output capacitor coupled to the output end of the power transfer circuit, wherein the AC output voltage is generated on the output capacitor.

11. The method of the energy storage device for supplying power according to claim 10, the power transfer circuit comprises a DC/DC converter and a DC/AC inverter, the DC/AC inverter comprises the output capacitor, and the method of the energy storage device for supplying power comprises:

controlling the DC/DC converter to transfer the first DC voltage into a second DC voltage; and controlling the DC/AC inverter to transfer the second DC voltage into the AC output voltage.

12. The method of the energy storage device for supplying power according to claim 11, comprising:

turning off a plurality of voltage conversion switches comprised in the DC/AC inverter during the default period to disable the power transfer circuit.

13. The method of the energy storage device for supplying power according to claim 9, comprising:

determining a resistance value of the load according to a voltage difference of the AC output voltage; and determining whether to shut down the energy storage device according to the resistance value of the load.

14. The method of the energy storage device for supplying power according to claim 13, comprising:

periodically disabling the power transfer circuit and determining whether to shut down the energy storage device according to a voltage difference of the AC output voltage in the default period when the resistance value of the load is less than or equal to a default resistance value; and shutting down the energy storage device when the resistance value of the load is greater than the default resistance value.

15. The method of the energy storage device for supplying power according to claim 9, comprising:

periodically disabling the power transfer circuit and obtaining the second voltage difference value when the difference is greater than or equal to a default difference, and determining whether to shut down the energy storage device according to the difference between the first voltage difference value and the second voltage difference value; and shutting down the energy storage device when the difference is less than the default difference.

16. The method of the energy storage device for supplying power according to claim 9, wherein the default phase is close to 0 or 180 degrees.

* * * * *